(12) United States Patent
Khalifa et al.

(10) Patent No.: US 8,925,590 B2
(45) Date of Patent: Jan. 6, 2015

(54) PIPELINE LEAK DETECTION AND REPAIR DEVICE

(71) Applicant: King Fahd University of Petroleum and Minerals, Dhahran (SA)

(72) Inventors: Atia Esmaeil Khalifa, Dhahran (SA); Samir Mekid, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 176 days.

(21) Appl. No.: 13/762,275

(22) Filed: Feb. 7, 2013

(65) Prior Publication Data

US 2014/0216587 A1 Aug. 7, 2014

(51) Int. Cl.
| F16L 55/16 | (2006.01) |
| F16L 55/18 | (2006.01) |
| F16L 55/1645 | (2006.01) |
| F16L 55/32 | (2006.01) |

(52) U.S. Cl.
CPC .............. F16L 55/18 (2013.01); F16L 55/1645 (2013.01); F16L 55/32 (2013.01)
USPC ............................................. 138/97; 138/98

(58) Field of Classification Search
USPC ..................................... 138/97, 98
See application file for complete search history.

(56) References Cited

U.S. PATENT DOCUMENTS

| 2,672,162 A | 3/1954 | Brauer |
| 3,298,399 A | 1/1967 | Slade |
| 3,495,626 A * | 2/1970 | Nagel ............................... 138/97 |
| 3,830,260 A | 8/1974 | Baviello, Sr. |
| 4,991,651 A * | 2/1991 | Campbell ....................... 166/122 |
| 5,049,003 A | 9/1991 | Barton |
| 5,629,065 A | 5/1997 | Schinabeck |
| 6,019,136 A | 2/2000 | Walsh et al. |
| 6,142,187 A * | 11/2000 | Goldenberg et al. ........... 138/97 |
| 6,427,602 B1 * | 8/2002 | Hovis et al. ................. 104/138.1 |
| 6,820,653 B1 | 11/2004 | Schempf et al. |
| 6,966,950 B2 * | 11/2005 | Winiewicz et al. ........... 118/712 |
| 2001/0033065 A1 | 10/2001 | Nelson et al. |
| 2003/0116211 A1 | 6/2003 | Ward |
| 2006/0037659 A1 | 2/2006 | Gillam |
| 2007/0220733 A1 * | 9/2007 | Crocker et al. ............... 29/522.1 |
| 2010/0043903 A1 * | 2/2010 | Muhlin ............................ 138/98 |
| 2011/0155273 A1 * | 6/2011 | Cain ............................... 138/97 |

FOREIGN PATENT DOCUMENTS

GB 2343728 5/2000

* cited by examiner

*Primary Examiner* — J. Casimer Jacyna
*Assistant Examiner* — Vishal Pancholi
(74) *Attorney, Agent, or Firm* — Richard C Litman

(57) ABSTRACT

The pipeline leak detection and repair device is an autonomous machine that travels through a pipeline to detect very small leaks therein. The device also repairs those leaks with an on-board repair component. The repair occurs nearly simultaneously with the leak detection as the device passes the leak. The device includes a plurality of thin, flexible sensor leaves in a radial array. The leaves are positioned to place them nearly in contact with the inner surface of the pipe wall. Each leaf includes two sensors installed on its opposite surfaces. Flexure of the leaf due to changes in pressure gradient as the leaf passes a leak results in signals from the sensors being sent to an onboard processor. The processor determines the position of the affected leaf, and rotates a repair component to apply a pressure-sensitive tape patch over the leak as the repair component passes the leak.

18 Claims, 5 Drawing Sheets

PIPELINE LEAK DETECTION AND REPAIR DEVICE

BACKGROUND OF THE INVENTION

1. Field of the Invention

The present invention relates generally to autonomous robotic mechanisms, and particularly to a pipeline leak detection and repair device. The device travels through a fluid pipeline (e.g., water, gas, oil, etc.), detects small leaks, and repairs those leaks automatically.

2. Description of the Related Art

Fluid leakage from pipelines, e.g., gas, oil, and water, is a chronic problem in the industry. The financial losses resulting from fluid loss can be significant, depending upon the value of the fluid and the size of the leak, among other factors. Moreover, many pipeline leaks occur in low pressure lines, with contamination leaking into the pipe rather than outward from the pipe. This is a major concern in the case of potable water, as even a very small leak can contaminate a water supply with bacteria or other hazards. In other cases, the fluid carried in the pipeline may be hazardous to the environment (e.g., oil), and leakage from the pipe can contaminate a large area if the leak continues for some period of time.

Most pipeline leak detection devices and systems are adapted for the detection of relatively large leaks, as the financial loss and potential hazards are generally proportional to the leakage volume per unit of time. These large leak detection devices are incapable of detecting relatively small leaks, and in the case of water pipelines such small water leaks are generally neglected. However, numerous small leaks can result in a significant loss of fluid over an extended period of time, and a corresponding financial loss. Perhaps the most common principle of leak detection is the acoustic method, in which a highly sensitive acoustic detector searches for the change in acoustic signal clue to fluid passing through a small leak or disruption in the pipe. However, many older pipes are being replaced with plastic (polyvinyl chloride, or PVC) pipe, and such acoustic sensors generally do not work well in such plastic pipe.

One universal symptom of a pipeline leak is the change in pressure gradient of the fluid near the leak. The change in pressure gradient is generally not readily detectable near the center of the flow through the pipe, except in the case of very large leaks. Accordingly, most leak detection devices are incapable of detecting very small leaks and seepage, as noted further above. Moreover, even where such very small leaks and seeps may be detected, these devices do nothing to stop the leak. Leak stoppage must be performed by a separate operation after detection of the leak.

Thus, a pipeline leak detection and repair device solving the aforementioned problems is desired.

SUMMARY OF THE INVENTION

The pipeline leak detection and repair device is an autonomous machine that travels within a fluid pipeline, and that simultaneously detects and repairs small leaks and seeps in the pipeline wall. The device is supported by forward and rearward wheels extending from multiple arms disposed in a radial array. At least one of the wheels may be powered to provide active motion. Alternatively, the device may be carried through the pipeline by the fluid flowing in the line.

The forward end of the device includes a plurality of sensor leaves disposed in a radial array. The circular diameter defined by the sensor leaves is adjusted to position the leaves immediately adjacent to the interior of the pipe wall. Each sensor leaf is formed of a very thin and flexible sheet of material (metal, plastic, etc.) and includes two mutually opposed strain gauges installed on opposite surfaces of the leaf. (Other types of sensors may be used in lieu of strain gauges, e.g., pressure and/or force sensors, piezoelectric sensors, etc.) As the leaf encounters a slight fluid leak, it is drawn in the direction of fluid flow through the leak. The leaf flexure changes the output of the two strain gauges of the leaf. The signals from the strain gauges are sent to a microcontroller installed in the device.

The microcontroller determines which of the leaves is affected by the leak and sends a signal to rotate the repair component of the device about the longitudinal axis of the device to align the repair component with the affected leaf, thus aligning the repair component with the detected leak. The rate of travel of the device through the pipeline is determined by the rotational speed of one or more of the supporting wheels, and as the longitudinal distance between the affected sensor leaf and the repair component is known, the elapsed time from leak detection to arrival of the repair component at the leak may be determined.

The repair component is activated when it arrives at the leak detected by the sensor leaf at the front of the device. The repair component comprises a plurality of pressure-sensitive, flexible adhesive patches carried on a flexible release sheet tape. The tape is carried on a roll in the repair component. The tape passes over a roller at the outer end of an adjustably extendable arm. Used tape is collected on a takeup roller within the repair component. As the repair component reaches the leak, the arm is extended to press the tape against the inner surface of the pipe wall using the roller at the end of the arm. One or more of the pressure-sensitive adhesive patches adheres to the inner surface of the pipe wall and releases from the release sheet, thereby sealing the leak as the device passes. The location of the leak and patch may be recorded in an on-board electronic memory.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The pipeline leak detection and repair device is a completely autonomous machine that is capable of traveling through a gas, oil, water, or other pipeline to detect small leaks therein. Moreover, the device automatically seals those leaks nearly simultaneously as it passes them. The only delay is the very short time span between the detection of the leak at the front of the device and the sealing of the leak by the mechanism toward the rearward portion of the device as the device travels through the pipeline.

Figure 1:
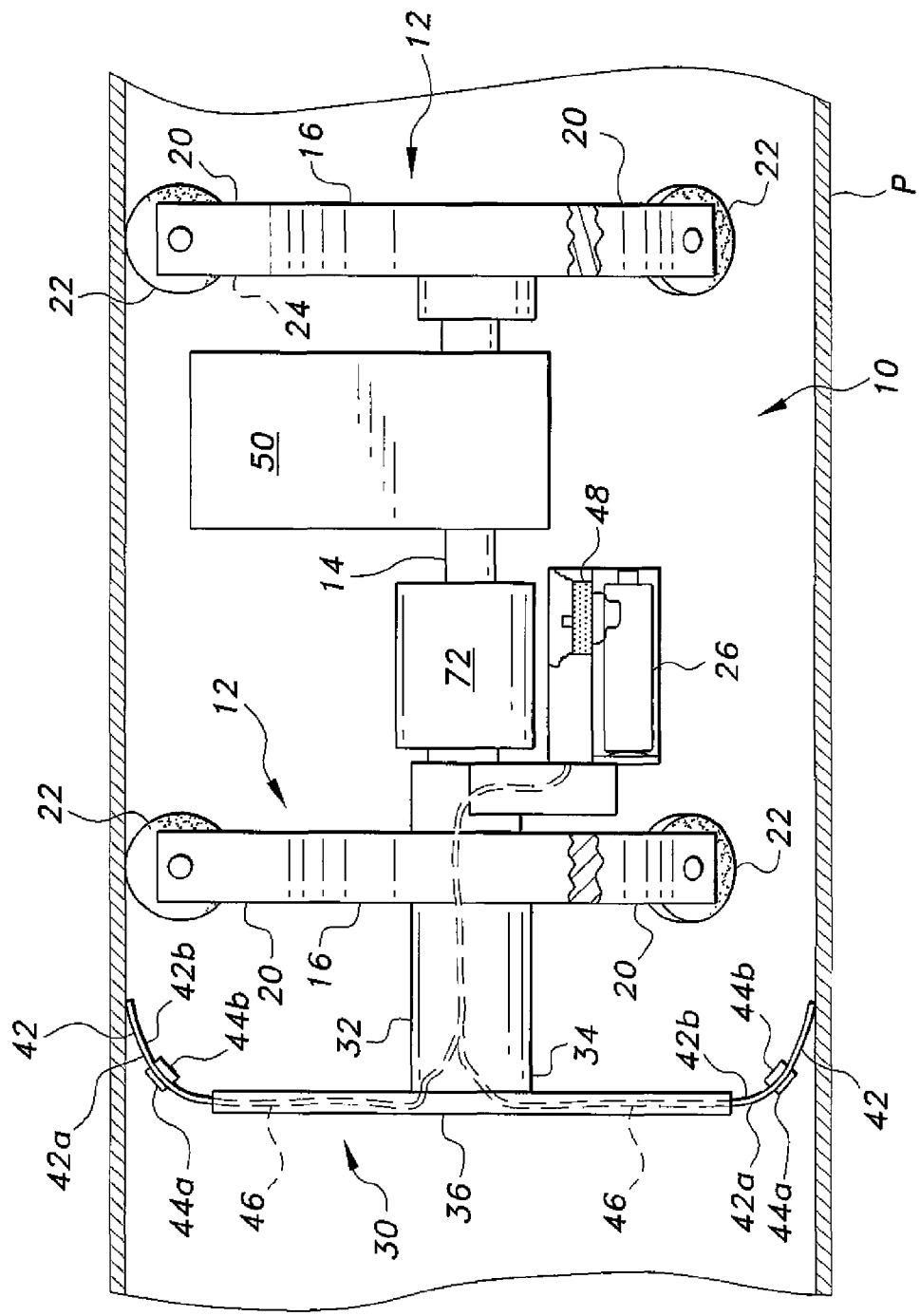
FIG. 1 is an environmental side elevation view in section of a pipeline leak detection and repair device according to the present invention, shown within a pipeline.

FIG. 1 of the drawings provides a schematic side elevation view of the pipeline leak detection and repair device 10, shown traveling through a pipeline P. The device 10 comprises substantially identical front and rear supports 12 joined by an axial connecting column 14. The only difference between the two supports is their relative locations and the installation of a drive motor to drive at least one of the wheels on one of the supports, as discussed further below.

Figure 3:
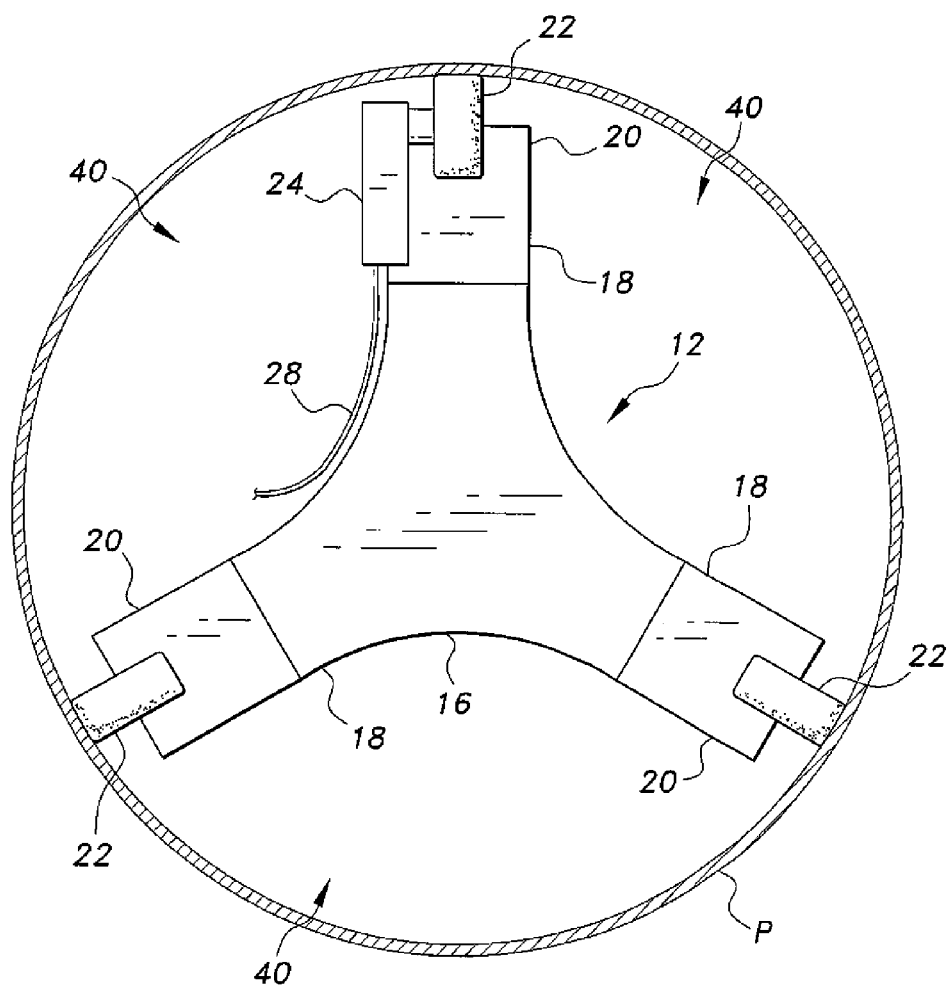
FIG. 3 is another end elevation view in section of the pipeline leak detection and repair device of FIG. 1, showing the rearward support wheel assembly.

Each support 12 comprises a central support hub 16 having a plurality of arms 18 extending radially therefrom, as shown in FIG. 3. Three such arms 18 are preferably provided, as the distal ends 20 of the three arms serve to center the supports 12 within the pipe P when the lengths of the arms are adjusted to fit closely within the pipe P. A wheel 22 is installed on the distal end 20 of each of the arms. The wheels 22 roll along the interior wall of the pipe P as the device 10 travels through the pipe. Conventional suspension springs (not shown) may be provided between the distal ends 20 of the arms and the wheels 22 to position the wheels securely upon the inner surface of the pipe P. While the device 10 may be carried passively through the pipe P by the fluid flow within the pipe, a motor 24 may be installed upon one of the arms 18 to drive the corresponding wheel 22, as shown in FIG. 3. Power for the motor 24 may be provided by an on-board battery 26 or the like, through a cable or harness 28. More such motors may be installed upon other arms to drive other wheels, but a single drive motor and driven wheel is sufficient in most circumstances to move the device 10 through a pipe containing a stationary fluid or against the flow of fluid within the pipe.

Figure 2:
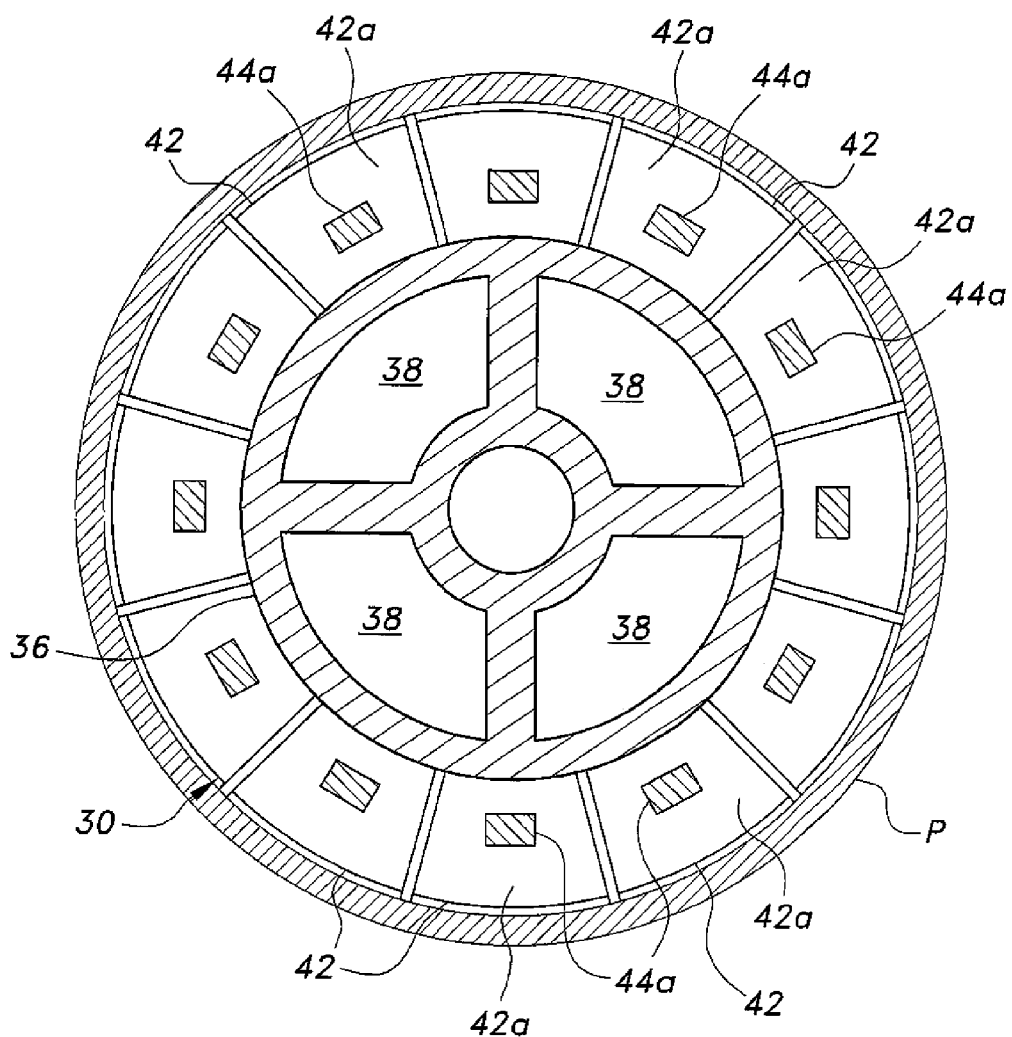
FIG. 2 is an end elevation view of the pipeline leak detection and repair device of FIG. 1, showing the arrangement of the leak detection sensors.

A leak sensor mechanism 30 is installed forward of the front support 12, as shown in FIG. 1 of the drawings. The mechanism 30 is shown in the front view of FIG. 2 as well. The mechanism 30 comprises a leak sensor column 32 extending forward from the front support 12. The column 32 has a forward end 34 having a leak sensor support ring 36 installed thereon. The leak sensor support ring 36 has a circular configuration of predetermined diameter in order to fit reasonably closely within the pipe P, with a slight gap or space between the periphery of the ring 36 and the interior of the pipe P. The support ring 36 includes a plurality of flow passages 38 therethrough in order to allow fluid in the pipe P to flow through and past the device 10. Similarly, the spaced apart radially disposed arms 18 of the two supports 12 define flow passages 40 therebetween, as shown in FIG. 3 of the drawings.

A plurality of flexible leak detector leaves 42 extend radially outward from the periphery of the ring 36. Each leaf 42 has a relatively large circumferential span and a relatively small clearance or gap between adjacent leaves in order to provide substantially complete coverage of the area adjacent to the wall of the pipe P. Each leaf 42 has a forwardly disposed surface 42*a* and an opposite rearwardly disposed surface 42*b*, as shown in FIG. 1. Strain gauges 44*a*, 44*b* are installed upon the two surfaces 42*a* and 42*b* of each of the leaves 42. Various types or principles of pressure or force measuring gauges, piezoelectric sensors, etc., may be used in lieu of strain gauges in order to sense movement of the flexible sensor leaves 42.

Any leaks in the wall of the pipe P will result in a localized pressure gradient very near the leak. This pressure gradient will result in the adjacent leaf 42 being drawn toward the outflow toward the leak, thus flexing the leaf 42 as the device 10 travels through the pipeline P. As the leaf 42 flexes, the two strain gauges 44*a* and 44*b* are affected. The strain gauges 44*a* and 44*b* communicate electrically by means of a wiring harness 46 with a microcontroller 48 located between the two supports 12, shown schematically in FIG. 1 of the drawings.

The device 10 includes a leak repair mechanism 50, in addition to the other components described further above. The repair mechanism 50 is shown generally in FIG. 1, and in detail schematically in FIGS. 4A and 4B of the drawings. The leak repair mechanism 50 includes a base 52 that serves as a mounting location for the applicator arm 54 that applies the repair patches within the pipe. The arm 54 is pivotally installed on the base 52 by a pivot pin 56. An actuator 58 (e.g., a solenoid) is attached to the proximal lower end of the arm 54, opposite the distal end 60 thereof. A roller 62 is installed upon the distal end 60 of the arm 54.

A tape roll 64 carries a roll of leak sealing applicator tape 66 thereon. The tape 66 comprises a release sheet having leak sealing material disposed thereon for application to the leak(s). The tape 66 extends from the roll 64, around the roller 62 at the distal end 60 of the arm 54, and back to a takeup roll 68 disposed with the base 52, i.e., adjacent thereto. The leak sealing material preferably comprises a plurality of spaced-apart, pressure-sensitive adhesive patches 70 disposed in a linear array along the length of the release sheet.

Figure 4A:
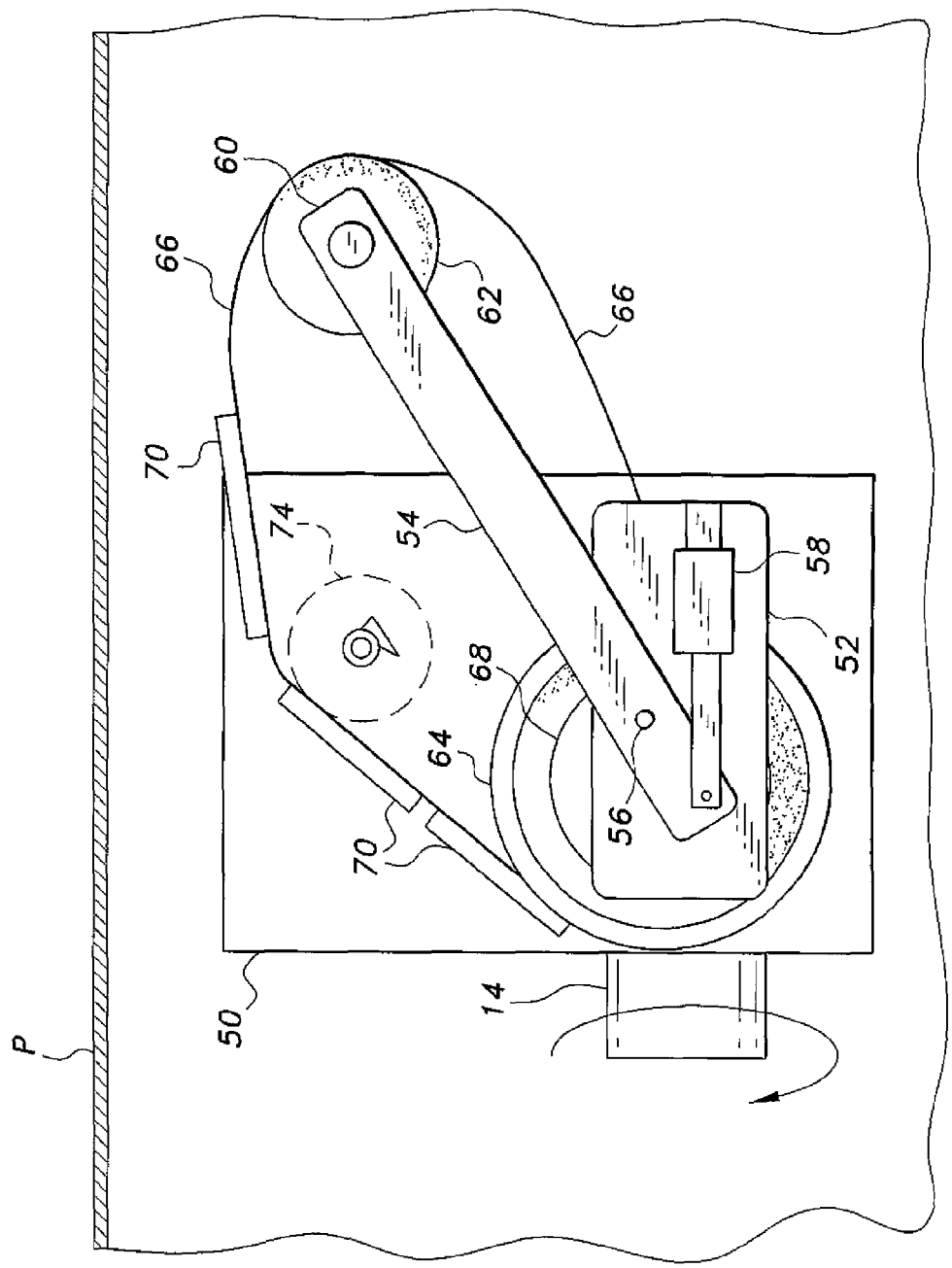
FIG. 4A is a side elevation view in section of the patch dispensing mechanism of a pipeline leak detection and repair device according to the present invention, showing the applicator arm in its retracted state.
Figure 4B:
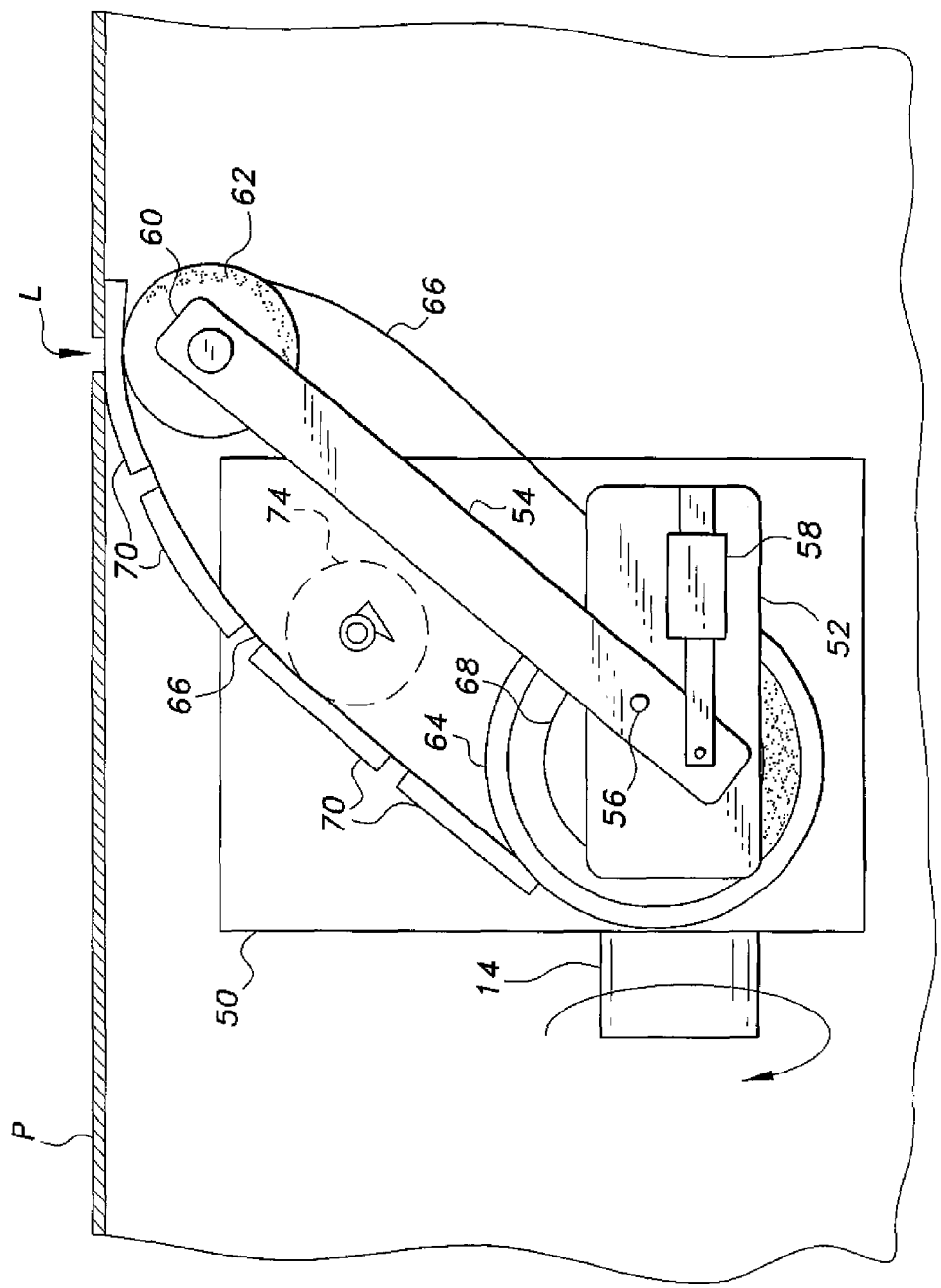
FIG. 4B is a side elevation view in section of the patch dispensing mechanism of the pipeline leak detection and repair device similar to FIG. 4A, but showing the applicator arm in its extended state for applying a patch over a leak.

The leak repair mechanism 50 is affixed to the central portion of the connecting column 14. The central portion of the column 14 and the leak repair mechanism 50 rotate between the two ends of the column 14 and their forward and rearward supports 12. A motor 72 (FIG. 1) rotates the central portion of the column 14 and the leak repair mechanism 50 thereon in accordance with signals received from the microcontroller 48. It will be seen that the relatively narrow tape 66 with its adhesive patches 70 will in most cases not be aligned longitudinally with the leak when the leak is encountered by any one of the leak detector leaves 42. However, each of the leaves 42 is connected separately to the microcontroller 48, and the microcontroller recognizes the relative radial position of the affected leaf 42. The microcontroller 48 then sends a corresponding signal to the motor 72, causing the motor to rotate the central portion of the column 14 between the two supports 12 to align the repair mechanism 50 (and especially the distal end 60 of the arm 54 with its roller 62 and repair tape 66 passing therearound) with the affected leaf 42, and thus with the leak L, generally as shown in FIG. 4B of the drawings.

When the arm 54 and repair tape 66 have been aligned longitudinally with the leak L, the microcontroller 48 determines the time interval from the initial encounter of the leak by the affected sensor leaf 42 to the positioning of the roller 62 therebeneath according to the rate of travel of the device 10 through the pipe P and the longitudinal span between the leaves 42 and the distal end 60 of the arm 54. The microcontroller 48 sends a signal to the arm actuator 58 to extend the arm 54 from its normally retracted position, as shown in FIG. 4A, to its extended position, as shown in FIG. 4B, to press the tape 66 and at least one of its pressure-sensitive adhesive patches 70 against the inner surface of the pipe P as the roller 62 passes across the leak L. It will be seen that while there is a very short time delay between the detection of the leak L and the travel of the device 10 to position a repair patch 70 across the leak, the process is very nearly simultaneous due to the very short time required for the device 10 to travel a distance equal to the short span between the sensor leaves 42 and the distal end 60 of the arm 54.

The pressure of the roller 62 against the tape 66 forces one of the pressure-sensitive adhesive patches 70 against the inner surface of the pipe P and across the leak L, thereby sealing the leak as the device 10 continues to travel through the pipe. The tape 66 separates from the back of the applied patch 70 as the tape winds around the roller 62, and is collected on the takeup roll 68. The tape 66 is automatically drawn from its dispensing roll 64 by the capture of the applied adhesive patch 70 against the fixed wall of the pipe P, so no drive mechanism is required to dispense the tape 66. A ratchet or sprag mechanism 74 or the like is provided to prevent any reverse movement of the tape 66 back toward the dispensing roll 64, and to assure that a fresh portion of tape 66 with a new adhesive patch 70 is positioned properly when another leak is encountered.

When the leak detection and repair device 10 has completed its passage through a length of pipe P, it may be retrieved conventionally for servicing and reuse. The electrical storage battery or batteries 26 may be recharged or replaced, and the tape 66 replaced with a new series of adhesive patches 70 thereon. The device 10 may optionally be equipped with an on-board recorder (not shown). The recorder may record the travel of the device through the pipe P in accordance with rotation of one or more of the wheels 22, and record the detection of any leaks encountered and the application of repair tape thereto. In this manner, the operators of the device 10 may retrieve a record of the location(s) of the leak(s) and their repair(s), for reference as required. Alternatively, or in addition to such on-board recording, the device 10 may include an on-board wireless communications device connected to the microcontroller 48 to communicate with a control station located outside the pipeline in order to provide real-time data regarding the location of any leaks detected, and to receive commands from the control station.

It is to be understood that the present invention is not limited to the embodiments described above, but encompasses any and all embodiments within the scope of the following claims.

We claim:

1. A pipeline leak detection and repair device, comprising:
    a front support and a rear support;
    a connecting column affixed axially between the supports;
    a leak repair mechanism disposed upon the connecting column;
    a leak sensor mechanism, including:
        a leak sensor column extending forward of the front support, the leak sensor column having a forward end;
        a leak sensor support ring disposed upon the forward end of the leak sensor column;
        a plurality of flexible leak sensor leaves extending radially from the support ring; and
        at least one sensor disposed upon each of the sensor leaves.

2. The pipeline leak detection and repair device according to claim 1, wherein each of the sensor leaves has mutually opposed first and second surfaces, said at least one sensor comprising a sensor disposed upon each of the surfaces.

3. The pipeline leak detection and repair device according to claim 1, wherein the leak repair mechanism comprises:
    a base;
    a selectively extendible and retractable arm extending pivotally from the base, the arm having a distal end;
    a roller disposed upon the distal end of the arm;
    an actuator disposed on the base, the actuator being connected to the arm, the actuator selectively extending and retracting the arm;
    a leak sealing applicator tape roll disposed on the base;
    a takeup reel disposed on the base;
    a release sheet tape disposed about the roll and extending about the roller to the takeup reel; and
    leak sealing material disposed upon the release sheet tape.

4. The pipeline leak detection and repair device according to claim 3, wherein the leak sealing material comprises a plurality of spaced-apart, pressure-sensitive adhesive patches.

5. The pipeline leak detection and repair device according to claim 1, wherein the front support and the rear support comprise:
    a front support hub and a rear support hub, each of the hubs having a plurality of arms extending radially therefrom, each of the arms having a distal end; and
    a wheel disposed at the distal end of each of the arms.

6. The pipeline leak detection and repair device according to claim 5, further including a drive motor selectively driving at least one of the wheels.

7. The pipeline leak detection and repair device according to claim 5, wherein:
    the arms of each said support hub define a plurality of flow passages therebetween; and
    the leak sensor support ring defines a plurality of flow passages therethrough.

8. A pipeline leak detection and repair device, comprising:
    a front support and a rear support;
    a leak sensor mechanism extending forward of the front support;
    a connecting column affixed axially between the supports;
    a leak repair mechanism rotationally disposed about the connecting column, the leak repair mechanism having:
        a base;
        a selectively extendible and retractable arm extending pivotally from the base, the arm having a distal end;
        a roller disposed upon the distal end of the arm;
        an actuator disposed on the base, the actuator being connected to the arm, the actuator selectively extending and retracting the arm;
        a leak sealing applicator tape roll disposed on the base;
        a takeup reel disposed on the base;
        a release sheet tape disposed about the tape roll and extending about the roller to the takeup reel; and
        leak sealing material disposed upon the leak sealing applicator tape.

9. The pipeline leak detection and repair device according to claim 8, wherein the leak sealing material comprises a plurality of spaced-apart, pressure-sensitive adhesive patches.

10. The pipeline leak detection and repair device according to claim 8, wherein the leak sensor mechanism comprises:
    a leak sensor column extending forward of the front support, the leak sensor column having a forward end;
    a leak sensor support ring disposed upon the forward end of the leak sensor column;
    a plurality of flexible leak sensor leaves extending radially from the support ring;
    at least one sensor disposed upon each of the sensor leaves.

11. The pipeline leak detection and repair device according to claim 10, wherein each of the sensor leaves has mutually opposed first and second surfaces, said at least one sensor comprising a sensor disposed upon each of the surfaces.

12. The pipeline leak detection and repair device according to claim 8, wherein the front support and the rear support comprise:
    a front support hub and a rear support hub, each of the hubs having a plurality of arms extending radially therefrom, each of the arms having a distal end; and
    a wheel disposed at the distal end of each of the arms.

13. The pipeline leak detection and repair device according to claim 12, further including a drive motor selectively driving at least one of the wheels.

14. The pipeline leak detection and repair device according to claim 12, wherein:
    the arms of each said support hub define a plurality of flow passages therebetween; and
    the leak sensor support ring defines a plurality of flow passages therethrough.

15. A pipeline leak detection and repair device, comprising:
- a front support hub and a rear support hub, each of the hubs having a plurality of arms extending radially therefrom, each of the arms having a distal end;
- a wheel disposed at the distal end of each of the arms;
- a leak sensor mechanism extending forward of the front support hub, wherein the leak sensor mechanism comprises:
  - a leak sensor column extending forward of the front support hub, the leak sensor column having a forward end;
  - a leak sensor support ring disposed upon the forward end of the leak sensor column;
  - a plurality of flexible leak sensor leaves extending radially from the support ring, each of the sensor leaves having mutually opposed first and second surfaces; and
  - a sensor disposed upon each of the surfaces;
- a connecting column affixed axially between the support hubs; and
- a leak repair mechanism rotationally disposed about the connecting column.

16. The pipeline leak detection and repair device according to claim 15, further including a drive motor selectively driving at least one of the wheels.

17. The pipeline leak detection and repair device according to claim 15, wherein the leak repair mechanism comprises:
- a base;
- a selectively extendible and retractable arm extending pivotally from the base, the arm having a distal end;
- a roller disposed upon the distal end of the arm;
- an actuator disposed on the base, the actuator being connected to the arm, the actuator selectively extending and retracting the arm;
- a leak sealing applicator tape roll disposed on the base;
- a takeup reel disposed on the base;
- a release sheet tape disposed about the roll and extending about the roller to the takeup reel; and
- leak sealing material disposed upon the release sheet tape.

18. The pipeline leak detection and repair device according to claim 17, wherein the leak sealing material comprises a plurality of spaced-apart, pressure-sensitive adhesive patches.

* * * * *